(12) United States Patent
Saito

(10) Patent No.: US 10,503,577 B2
(45) Date of Patent: Dec. 10, 2019

(54) MANAGEMENT SYSTEM FOR MANAGING COMPUTER SYSTEM

(71) Applicant: HITACHI, LTD., Tokyo (JP)

(72) Inventor: Yasuyuki Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 230 days.

(21) Appl. No.: 15/552,856

(22) PCT Filed: Jun. 1, 2015

(86) PCT No.: PCT/JP2015/065817
§ 371 (c)(1),
(2) Date: Aug. 23, 2017

(87) PCT Pub. No.: WO2016/194119
PCT Pub. Date: Dec. 8, 2016

(65) Prior Publication Data
US 2018/0032388 A1    Feb. 1, 2018

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0787* (2013.01)

(58) Field of Classification Search
CPC .............. G06F 11/079; G06F 11/0751; G06F 11/0766; G06F 11/0787; G06F 11/32; G06F 11/3006; G06F 11/301; G06F 11/3048
See application file for complete search history.

(56) References Cited

U.S. PATENT DOCUMENTS

| | | | |
|---|---|---|---|
| 2003/0110007 A1* | 6/2003 | McGee | G06F 11/0709 702/179 |
| 2005/0114608 A1 | 5/2005 | Oshima et al. | |
| 2005/0251625 A1 | 11/2005 | Nagae et al. | |

(Continued)

FOREIGN PATENT DOCUMENTS

| | | |
|---|---|---|
| JP | 2005-157711 A | 6/2005 |
| JP | 2005-316635 A | 11/2005 |

(Continued)

OTHER PUBLICATIONS

International Search Report for WO 2016/194119 A1, dated Aug. 4, 2015.

*Primary Examiner* — Joseph D Manoskey
(74) *Attorney, Agent, or Firm* — Volpe and Koenig, P.C.

(57) ABSTRACT

As a type of an event that occurs in a computer system, an event type for which display of performance data is to be requested in the future is defined in advance. A management system, upon detection of occurrence of an event that belongs to the event type for which it is defined that display of performance data is to be requested in the future, selects, as a read-ahead target, at least one of an event component which is a component in which the detected event has occurred, and a relevant component which is a component directly or indirectly coupled to the event component. When the performance data of the selected component is not stored in a memory, the management system reads the performance data of the selected component from a performance store to the memory.

9 Claims, 10 Drawing Sheets

(56) References Cited

U.S. PATENT DOCUMENTS

| | | | |
|---|---|---|---|
| 2007/0124437 A1* | 5/2007 | Chervets | H04L 41/0681 709/223 |
| 2008/0065928 A1 | 3/2008 | Suzuki et al. | |
| 2012/0290718 A1* | 11/2012 | Nethercutt | G06F 11/3006 709/224 |
| 2013/0227352 A1* | 8/2013 | Kumarasamy | G06F 11/3072 714/47.1 |
| 2014/0223427 A1* | 8/2014 | Bootland | G06F 8/61 718/1 |

FOREIGN PATENT DOCUMENTS

| | | |
|---|---|---|
| JP | 2008-065668 A | 3/2008 |
| JP | 2013-003950 A | 1/2013 |

\* cited by examiner

Configuration table
191

| 401 | 402 | 403 | 404 | 405 |
|---|---|---|---|---|
| Component ID | Component type | Component name | V/P | Relevant component ID |
| 00012 | VM | VirtualMachine-1 | Virtual | 00032 |
| 00013 | Server | Server-1 | Physical | 00035,00036,00412 |
| .. | ... | .. | ... | ... |

FIG. 5

Configuration change history table
192

| Configuration change time | Comp-onent ID | Comp-onent type | Change type | Before change | After change | Person who performs change |
|---|---|---|---|---|---|---|
| yyyy/mmd/d HH:MM:SS.SS0 | 00003 | Server | Change link | A | B | user1 |
| yyyy/mm/dd HH:MM:SS.SS1 | 00005 | VM | Create | null | - | user2 |
| ... | ... | ... | ... | ... | ... | ... |

Operation history table
193

| Operation time | Compon-ent ID | Compon-ent type | Operation portion | Operation type | Operation detail | Person who performs change |
|---|---|---|---|---|---|---|
| yyyy/mmd/d HH:MM:SS.SS0 | 00003 | Server | Menu 1 | Click | user1 | user1 |
| yyyy/mm/dd HH:MM:SS.SS1 | 00005 | VM | - | Creation | Create VM1 on ESX2 | user2 |
| ... | ... | ... | ... | ... | ... | ... |

Failure occurrence history table
194

| Failure occurrence time | Component ID | Component type | Failure metric type | Failure type | V/P | Failure level |
|---|---|---|---|---|---|---|
| yyyy/mmd/d HH:MM:SS.SS0 | 00003 | VM | - | Down | Virtual | Significance |
| yyyy/mm/dd HH:MM:SS.SS1 | 00005 | VM | CPU | Exceeds upper limit | Physical | Alarm |
| ... | ... | ... | ... | ... | ... | ... |

FIG. 8

Read-ahead management table
197

| Registration time | Component ID | Component type | Event type | Score upon registration | V/P |
|---|---|---|---|---|---|
| yyyy/mm/dd HH:MM:SS.SS1 | 00003 | VM | Failure | 10 | Virtual |
| yyyy/mm/dd HH:MM:SS.SS2 | 00004 | Disk | Configuration change | 3 | Physical |
| ... | ... | ... | ... | ... | ... |

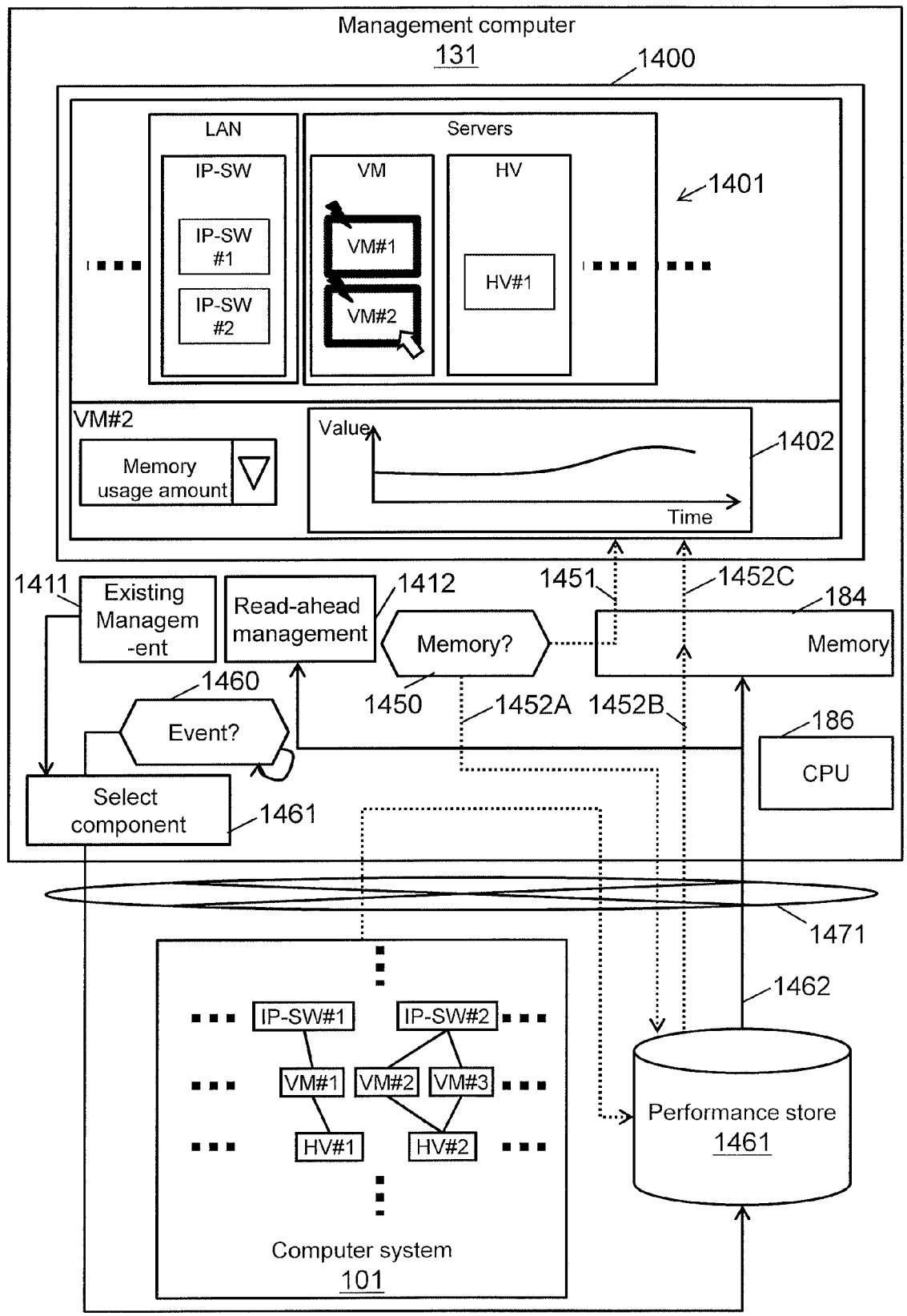

MANAGEMENT SYSTEM FOR MANAGING COMPUTER SYSTEM

TECHNICAL FIELD

The present invention generally relates to management of a computer system.

BACKGROUND ART

As a computer system has a larger scale and becomes more complicated, how to manage (for example, monitor) components (for example, physical or virtual equipment) within the computer system becomes important. For example, in the case where a failure occurs at a certain component, because the failure spreads to other components, it appears as if failures occurred at components more than components where failures actually occur on a management screen (for example, a GUI (Graphical User Interface)). Therefore, a manager analyzes which component is a fundamental cause of the failure or an influence range of the failure with reference to information displayed on the management screen.

Displaying a component (to be exact, for example, an object of a component) relevant to a component where a failure occurs or displaying performance data of a component (for example, a component designated by the manager) helps analysis by the manager (for example, displays information of a clue for searching the fundamental cause).

Here, it is desirable that the performance data which is to be displayed on the management screen is stored in a memory (for example, a cache memory) of the management system at a time point when it becomes necessary to display the performance data (for example, at a time point when the component is designated by the user), because it is possible to display the performance data in a short period of time since it becomes necessary to display the performance data.

However, if the computer system to be managed has a large scale or is complicated, normally, it is impossible to store performance data of all the components of the computer system in the memory of the management system, because a total amount of capacity of the performance data of the components of the computer system is larger than capacity of the memory (the total amount is, for example, several hundred gigabytes to several terabytes, while it depends on the number of components, or the like). Therefore, typically, the performance data is stored in a store (one or more storage devices) having larger capacity than that of the memory, and performance data to be displayed is read from the store to the memory.

In the technology of PTL 1, the management computer causes a storage apparatus to read ahead a file which can be accessed by a computer to a cache memory of the storage apparatus based on access history of the computer which accesses a file within the storage apparatus.

CITATION LIST

Patent Literature

[PTL 1] Japanese Patent Laid-Open No. 2005-157711

SUMMARY OF INVENTION

Technical Problem

It is difficult to select performance data to be displayed as a read-ahead target (in other words, predict performance data to be displayed) even by utilizing the read-ahead technology of PTL 1. The reason is, for example, as follows. Typically, performance data is data which increases as a result of being regularly or irregularly collected (for example, measured) (for example, a plurality of pieces of performance data respectively collected at a plurality of respective time points are a plurality of pieces of time-series data, that is, stream data). Therefore, the same performance data is less likely to be repeatedly selected as a display target among a plurality of pieces of performance data of a plurality of components. Further, a performance value indicated by each of a plurality of pieces of time-series performance data is different over time. Therefore, it is difficult to predict performance data to be displayed based on access history.

Solution to Problem

As a type of an event occurring in a computer system, an event type for which display of performance data is to be requested in the future is defined in advance. In the case where a management system detects occurrence of an event belonging to an event type defined as the event type for which display of performance data is to be requested in the future, the management system selects at least one of relevant components which are directly or indirectly coupled to an event component which is a component where the detected event occurs, as a read-ahead target. In the case where performance data of the selected component is not stored in a memory, the management system reads the performance data of the selected component from a performance store to the memory. Note that the "case where performance data of the selected component is not stored in a memory" may be a case where all the performance data of the selected component is not stored in the memory or a case where part of the performance data of the selected component is not stored in the memory. In a latter case, performance data to be read ahead may be part of the performance data or may be all the performance data of the selected component.

Advantageous Effects of Invention

It is possible to improve accuracy of read-ahead of performance data to be displayed among performance data of a plurality of components of a computer system to be managed.

BRIEF DESCRIPTION OF DRAWINGS

FIG. 5 illustrates a configuration example of a configuration change history table.

FIG. 6 illustrates a configuration example of an operation history table.

FIG. 7 illustrates a configuration example of a failure occurrence history table.

FIG. 8 illustrates a configuration example of a read-ahead management table.

FIG. 14 illustrates outline of the management computer according to the embodiment.

DESCRIPTION OF EMBODIMENT

Figure 1:
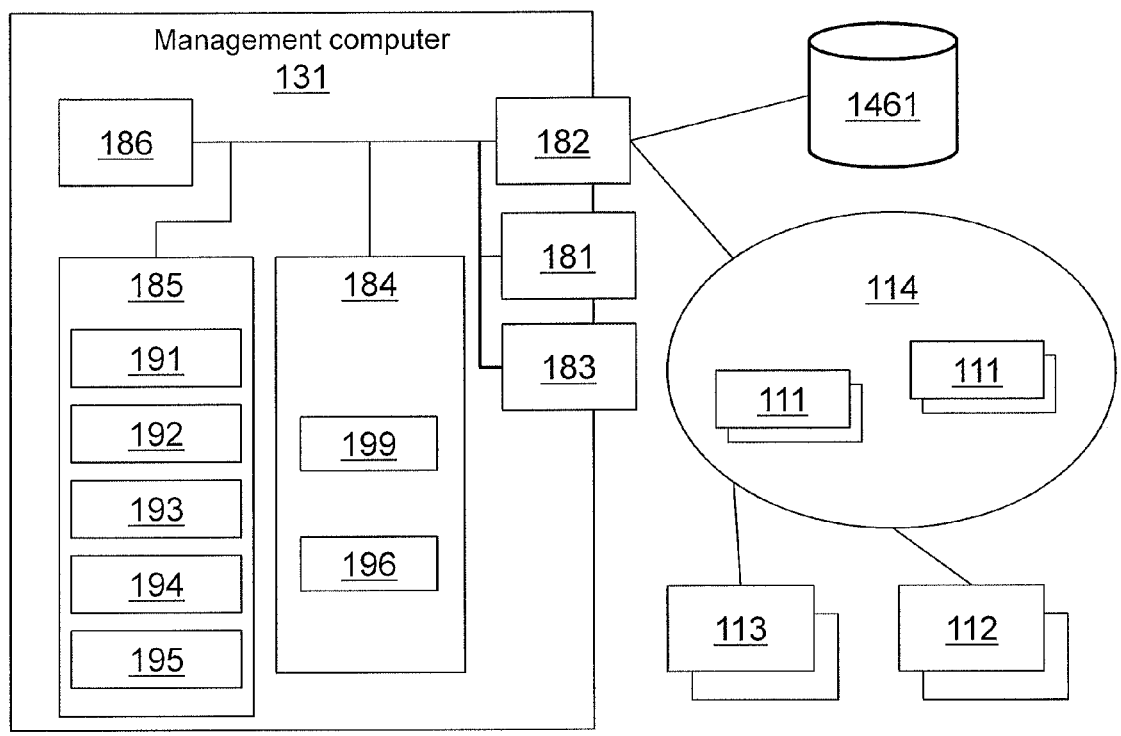
FIG. 1 illustrates a configuration example of a computer system and a management computer according to an embodiment.

In the following description, while information will be described using expression of an "abc table", the information may be expressed using a data configuration other than a table. To indicate that the information does not depend on the data configuration, at least one of the "abc table" can be referred to as "abc information". Further, in the following description, a configuration of each table is an example, and one table may be divided into two or more tables, or all or part of two or more tables may be made one table.

Further, while, in the following description, there is a case where processing is described using a "program" as a subject, because the set processing is performed using a storage resource (for example, a memory) and/or a communication interface device (for example, a communication port), or the like, as appropriate by the program being executed by a processor (for example, a CPU (Central Processing Unit)), the subject of the processing may be the processor. Processing described using the program as the subject may be processing performed by the processor or an apparatus having the processor. Further, the processor may include a hardware circuit which performs part or all of the processing. The program may be installed in an apparatus like a computer from a program source. The program source may be, for example, a program distributing server or a computer readable storage medium. In the case where the program source is the program distributing server, the program distributing server includes a processor (for example, a CPU) and a storage resource, and the storage resource further stores a distributing program and a program to be distributed. The processor of the program distributing server distributes the program to be distributed to other computers by executing the distributing program.

Further, the management system may be configured with one or more computers. Specifically, for example, in the case where the management computer displays the information (specifically, in the case where the management computer displays information on a display device of the management computer or the management computer transmits information for display to a remote computer for display), the management computer is the management system. Further, for example, in the case where functions equivalent to the management computer are implemented with a plurality of computers, the plurality of computers (which may include a computer for display in the case where a computer for display performs display) is the management system. Information may be input or output to or from the computer through an input/output device provided at the computer. While examples of the input/output device can include a display device, a keyboard and a pointing device, other devices may be employed in place of or in addition to at least one of these devices. Further, as a substitute for the input/output device, a serial interface device or an Ethernet interface device (Ethernet is a registered trademark) may be employed, a computer for display having a display device, a keyboard and a pointing device may be coupled to such an interface device, and information may be output (for example, displayed) and input by the computer transmitting information for display to the computer for display or the computer receiving information for input from the computer for display.

Further, in the following description, a "component" means an element (for example, particularly, a management target) of the computer system, and, specifically, is a general term for each of a plurality of nodes (apparatuses) constituting the computer system, and each of a plurality of modules provided at each node. As a node, there are a physical node (for example, a network switch) and a virtual node (for example, a virtual computer). In a similar manner, as a module, there are a physical module (for example, a microprocessor) and a virtual module (for example, an LDEV (logical volume)).

Further, in the following description, a "relevant component" of the component (a component relevant to the component) is a component directly or indirectly coupled to the component. In the case where the relevant component is "directly" coupled to the component, there is no component between the component and the relevant component (the number of hops=1), while, in the case where the relevant component is "indirectly" coupled to the component, there are one or more other components between the component and the relevant component (the number of hops=integer of two or more). A relevant component coupled in a higher level than the component can be referred to as a "high level relevant component", while a relevant component coupled in a lower level than the component can be referred to as a "low level relevant component". Further, among the high level relevant components, a relevant component directly coupled to the component can be referred to as a "parent component", while, among the low level relevant components, a relevant component directly coupled to the component can be referred to as a "child component". Note that concept of a "high level/low level" and a "parent/child" can change depending on what is managed (for example, monitored) by a user (manager) and may be omitted. For example, in the case where relevance is "coupling relationship" via an FC (Fibre Channel) switch between a server and a storage system, which of the server and the storage system is a higher level or a parent is not uniquely determined only in terms of coupling, and whether the server is regarded as a higher level, the storage system is regarded as a higher level, or concept of a higher or lower level is not taken into account, may be determined depending on a place of the user. On the other hand, in the case where relevance is inclusion (for example, a node includes a component), concept that the component is a lower level (or a child) of the node is often common regardless of the place of the user. Further, because the component can be a physical component or can be a virtual component, coupling between the components can be physical coupling (for example, physical coupling between ports) or can be logical coupling (for example, VM (virtual machine) can recognize a logical volume).

Further, in the following description, operation performed by the user (for example, the manager) using an input device on a GUI (Graphical User Interface) which is a management screen of the computer system can be referred to as "user operation". The input device used in the user operation is typically a pointing device or a touch screen. As an example of the user operation, there is operation of changing a configuration of a designated component.

First, outline of the present embodiment will be described.

In recent years, the computer system has a larger scale and becomes more complicated due to, for example, at least one of the following factors.

(*) A scales of processing to be handled at the computer system becomes larger.
(*) A plurality of types of processing as cloud service are executed by the computer system.
(*) Types of nodes within the computer system increase.
(*) An internal configuration of the node becomes complicated, types of components (for example, virtual components and physical components) constituting the node increase, and it becomes necessary to further manage these components.
(*) A virtualization technology (for example, virtualization of a server, virtualization of a network, virtualization of a storage, or virtualization of a data center) becomes widespread, and it becomes possible to divide or aggregate apparatuses.
(*) A deployment and migration technology has progressed.

Here, a "larger scale" indicates increase in the number of components to be managed within the computer system, such as nodes constituting the computer system and components of the nodes. Further, "more complicated" indicates, as a result of increase in types of components to be managed, at least one of relationship between components becoming M:1, 1:N or M:N (where M and N are respectively integers of 2 or more), a value of at least one of M and N becoming large and relationship between components momentarily changing.

In such an environment, the management computer displays an object of the component (such as, for example, an icon and a character string) on the management screen (GUI) or accepts a request for display of performance data of the component from the user and displays the requested performance data. The user can check a state of the component, analyze a failure, or the like, by looking at the management screen.

Here, it is desirable that the performance data to be displayed is stored in a memory (for example, a cache memory) of the management computer at a time point when display is required (for example, at a time point when the component is designated by the user), because it is possible to display the performance data on the management screen in a short period of time since it becomes necessary to display the performance data.

However, if the computer system has a large scale or is complicated, normally, it is impossible to store performance data of all the components of the computer system in the memory of the management computer, because a total amount of performance data of the components of the computer system is larger than capacity of the memory (the total amount is, for example, several hundred gigabytes to several terabytes while it depends on the number of components, or the like). Therefore, typically, the performance data is stored in a store having larger capacity than that of the memory (one or more storage devices (for example, an auxiliary storage device)), and the performance data to be displayed is read from the store (hereinafter, a performance store) to the memory of the management computer.

It is difficult to select the performance data to be displayed as a read-ahead target (in other words, predict the performance data to be displayed and read ahead the performance data to the memory) for, for example, the following reasons. Typically, the performance data is data which increases as a result of being regularly or irregularly collected (for example, measured) (for example, a plurality of pieces of performance data respectively collected at a plurality of different time points are a plurality of pieces of time-series data, that is, stream data). Therefore, the same performance data is less likely to be repeatedly selected as performance data to be displayed among a plurality of pieces of performance data of a plurality of components. Further, a performance value indicated by each of a plurality of pieces of time-series performance data is different over time.

Therefore, the management computer according to the present embodiment performs the following processing.

FIG. 14 illustrates outline of the management computer.

The computer system 101 managed by the management computer 131 (an example of the management system) includes a plurality of components. According to the example in FIG. 14, the plurality of components include an IP-SW (Internet protocol switch), VM (virtual machine) and a HV (hyper visor). The plurality of components belong to a plurality of different component types. The plurality of component types have tier relationship, and the plurality of components are associated in a tree shape along tiers of the component types. The configuration of the tree shape is an example of the configuration of a topology of the plurality of components. Because the plurality of component types have tier relationship, each component belongs to a layer to which a component type of the component belongs.

A performance store 1461 exists. The performance store 1461 is a store (one or more storage devices) in which performance data of the plurality of components is stored. The performance data within the performance store 1461 may be performance data collected and stored by the management computer 131 or may be performance data stored by each component. While the performance store 1461 is, typically, a store outside the management computer 131 (for example, a remote store accessed via a communication network 1471), the performance store 1461 may be an auxiliary storage device within the management computer 131.

In the present embodiment, one piece of performance data includes, for example, time (for example, measurement time), a metric type (for example, a "memory use rate") and a metric value (for example 65%) for each component. As a result of a plurality of metric values respectively indicated by a plurality of pieces of performance data at time belonging to a certain time slot for the same metric type being lined in chronological order, it is possible to recognize time-series change of the metric value. The performance data is collected by, for example, the CPU 186 of the management computer 131 with a predetermined period (for example, with a period according to the component type of the component) or irregularly for each component, and added to the performance store 1461. Among the performance data within the performance store 1461, performance data which becomes unnecessary (for example, performance data in which time of a certain time period before current time is recorded) may be deleted from the performance store 1461 by, for example, the CPU 186. It is possible to recognize whether or not the component normally operates in the computer system 101, or the like, from the time-series change of the metric value indicated by the time-series performance data. As a metric type, a CPU use rate, a memory use rate, a disk use rate, throughput (processing amount per unit time), response time, or the like, can be employed. The metric type is an example of a performance type. The metric value is an example of a performance value.

An event type for which display of the performance data is to be requested in the future is defined. Information indicating the event type defined in such a manner is, for example, stored in a storage unit including the memory 184 of the management computer 131. In the present embodiment, "event type for which display of the performance data is to be requested in the future" is one of a failure and configuration change.

The management computer 131 has existing management information 1411 and read-ahead management information 1412. The existing management information 1411 is management information which is used for managing the computer system 101 even if a read-ahead function according to the present embodiment is not provided. The existing management information 1411 includes information indicating a configuration of a topology of a plurality of components. The existing management information 1411 further includes event history information which is information indicating time at which an event belonging to the event type defined described above occurs and a component where the event occurs. The read-ahead management information 1412 is information for managing read-ahead of performance data of a component selected as a read-ahead target by the read-ahead function according to the present embodiment in the memory 184. The read-ahead management information 1412 includes, for example, an ID of the component, time (registered time) at which the performance data of the component is read to the memory 184, or the like. The existing management information 1411 and the read-ahead management information 1412 are stored in the storage unit including the memory 184.

The CPU 186 of the management computer 131 displays the management screen (for example, a GUI) 1400 based on the information stored in the memory 184. On the management screen 1400, for example, a component topology 1401 is displayed. In the component topology 1401, for example, an object of a base component (block with a bold-faced frame in FIG. 14) and an object of a relevant component of the base component are displayed in a multi-column form. The "base component" is sometimes a component selected (designated) by the user, and is sometimes an event component (component where an event belonging to the event type defined as the event type for which display of the performance data is to be requested in the future occurs). The component selected (designated) by the user as the base component is sometimes an event component. The event component may become a base component by being designated by the user or may become a base component without being designated by the user.

The CPU 186 accepts user operation for display of the performance data. In other words, the CPU 186 accepts a display request of the performance data via (or without via) the management screen 1400. For example, the CPU 186 receives designation of a component (in the example of FIG. 14, VM#2) and a metric type (in the example of FIG. 14, a memory usage amount of the memory 184) as a display target. In this case, the CPU 186 judges whether or not performance data to be displayed (among the performance data of the designated component, performance data corresponding to the designated metric type) is cached in the memory 184 with reference to the read-ahead management information 1412 (reference numeral 1450). In the case where the judgement result is affirmative, the CPU 186 displays the performance data to be displayed within the memory 184 without accessing the performance store 1461 (dashed arrow 1451). In the case where the judgment result is negative, the CPU 186 reads the performance data to be displayed from the performance store 1461 to the memory 184 (dashed arrows 1452A and 1452B) and displays the performance data read to the memory 184 (dashed arrow 1452C). According to the example in FIG. 14, display of the performance data to be displayed is display of a graph 1402 indicating change of a plurality of metric values indicated by a plurality of pieces of time-series performance data.

Note that a case where the judgement result is negative may include a case where only part of performance data among the performance data to be displayed is not stored in the memory 184. In this case, the CPU 186 may read only the part of the performance data from the performance store 1461 to the memory 184 or may read all the performance data to be displayed including the part of the performance data (or all the performance data of the designated component including the performance data to be displayed) from the performance store 1461 to the memory 184. Further, the CPU 186 may first read part of the performance data for display from the performance store 1461 to the memory 184 and display the performance data and read all the performance data (or remaining performance data) of the designated component from the performance store 1461 to the memory 184 asynchronously with display of the performance data. The CPU 186 registers information of the component (that is, the designated component) corresponding to the performance data read from the performance store 1461 to the memory 184 in the read-ahead management information 1412 (not illustrated).

As described above, if the performance data to be displayed is stored in the memory 184 at a time point when the management computer 131 receives a display request of the performance data, because it is not necessary to access the performance store 1461, it is possible to quickly display the performance data. Therefore, in the present embodiment, as described above, an event type for which display of the performance data is to be requested in the future is defined, and the CPU 186 starts read-ahead processing by being triggered by detection of occurrence of an event belonging to the defined event type (reference numeral 1460). In the read-ahead processing, the CPU 186 selects at least one of an event component which is a component where the event occurs and a relevant component of the event component as a read-ahead target (reference numeral 1461). The CPU 186 then reads (reads ahead) the performance data of the components selected as the read-ahead target from the performance store 1461 to the memory 184 in advance (solid arrow 1462). The CPU 186 registers information of the components corresponding to the read-ahead performance data in the read-ahead management information 1412. Note that if the performance data of the selected components has already been stored in the memory 184, read-ahead of the performance data of the selected components may be unnecessary or the components may not be selected as the read-ahead target. Alternatively, even if the performance data of the selected components has already been stored in the memory 184, the performance data of the selected components (for example, all the performance data or only performance data corresponding to a difference with the performance data in the memory 184) may be read from the performance store 1461 to the memory 184.

In this manner, according to the present embodiment, an event type for which display of the performance data is to be requested in the future is defined, and read-ahead processing is started by being triggered by detection of occurrence of an event belonging to the event type. As such an event type, in the present embodiment, a failure and configuration change of the component are employed. In the case where a failure occurs, it can be considered that the user browses performance data of at least one of a component where the failure occurs and a relevant component of the component to analyze a fundamental cause of the failure (or for other purposes). In the case where the configuration is changed, it can be considered that the user browses performance data of at least one of a component whose configuration is changed and a relevant component of the component to confirm a state after the configuration is changed (or for other purposes). Therefore, starting read-ahead processing by being triggered by detection of occurrence of an event belonging to the above-described defined event type is appropriate for characteristics that the user tends to browse the performance data in the case where an event belonging to the event type occurs.

Further, in the present embodiment, the read-ahead target is selected in unit of component. Selection of the read-ahead target in unit of component is appropriate for characteristics that a component is designated by the user for displaying the performance data in management of the computer system 101 (for example, work for analyzing a fundamental cause of the failure or work for checking a state after the configuration is changed), and thus, contributes to improvement of read-ahead accuracy. Note that it is considered that all the performance data of the designated component is preferably read ahead from the performance store 1461 to the memory 184, because even if which performance data is to be displayed among performance data of the component cannot be exactly predicted, all the performance data of the component has been read ahead to the memory 184.

Further, in the present embodiment, the relevant component of the event component can be specified based on the existing management information 1411. Further, a component to be read ahead can be selected based on event history information within the existing management information 1411. That is, in the present embodiment, a component to be read ahead can be selected based on the existing management information 1411 which is information used for managing the computer system 101 even if a read-ahead function is not provided.

The present embodiment will be described in detail below. Note that, in the following description, an event component is either a component where a failure occurs or a component whose configuration is changed. The "component whose configuration is changed" includes at least one of components, whose configuration is changed as a whole such as increase or decrease in the number even if the configuration of the component itself is not changed.

FIG. 1 illustrates a configuration example of the computer system 101 and the management computer 131.

The computer system 101 includes a communication network 114 (for example, a plurality of network switches 111), a plurality of servers 113 coupled to the communication network 114 and a plurality of storages 112 coupled to the communication network 114. There may be one server 113 and one storage 112. Each of the network switch, the server 113 and the storage 112 is an example of a physical component.

The management computer 131 has an interface device (I/F) 182 coupled to the computer system 101 (for example, the communication network 114) and the performance store 1461, an input device (for example, a keyboard and a mouse) 181 used by the user, a display device 183 at which the management screen, or the like, is displayed, a memory 184, an HDD (Hard Disk Drive) 185, and a CPU 186 coupled to these. The management computer 131 may be coupled to the server 113, the storage 112, or the like, of the computer system 101 via a communication network different from the communication network 114 of the computer system 101. The input device 181 and the display device 183 may be touch panels. The CPU 186 is an example of the processor (for example, an example of a microprocessor within the processor). The memory 184 and the HDD are an example of a storage unit including the memory 184. Note that the "storage unit including the memory 184" may be only the memory 184 or may include the memory 184 and a storage device other than the memory 184.

At least one of the memory 184 and the HDD stores the existing management information 1411 and the read-ahead management information 1412.

The existing management information 1411 includes a configuration table 191, a configuration change history table 192, an operation history table 193, a failure occurrence history table 194 and a user definition table 195. The configuration table 191 indicates a configuration of a topology of a plurality of components. The configuration change history table 192 indicates history of configuration change of a component. The operation history table 193 indicates history of user operation (which may exclude configuration change operation). The failure occurrence history table 194 indicates history of occurrence of a failure. The configuration change history table 192, the operation history table 193 and the failure occurrence history table 194 are an example of event history information. The user definition table 195 indicates user definition. The user definition may be, for example, at least one of information indicating a component designated by the user in advance (for example, a component with the highest degree of importance), definition that a failure and configuration change are event types for which display of the performance data is to be requested in the future, a score calculation rule which will be described later, and a maintenance and inspection schedule (for example, a pair of a component to be subjected to maintenance and inspection and schedule time of maintenance and inspection).

The read-ahead management information 1412 includes the read-ahead management table 196. The read-ahead management table 196 holds information relating to a component whose performance data selected as a read-ahead target is read ahead to the memory 184.

A management program 199 is stored in the memory 184. By the management program 199 being executed by the CPU 186, the CPU 186 can execute processing such as read-ahead processing. A cache area may be provided in the memory 184, and information displayed on the management screen (for example, performance data) may be stored in the cache area.

Figure 2:
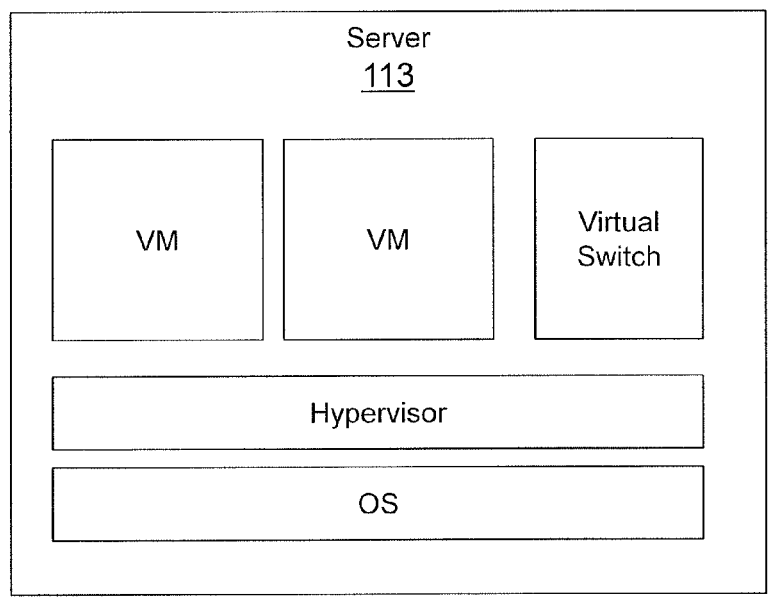
FIG. 2 illustrates an example of a virtual component of a server.

FIG. 2 illustrates an example of a virtual component of the server 113.

The server 113 is an example of a component (for example, a physical component). As a virtual component of the server 113, there are, for example, VM, a virtual switch, a hyper visor and an OS (Operating System). These virtual components are executed based on the physical component (such as, for example a CPU and a memory) of the server 113.

Figures 3, 4:
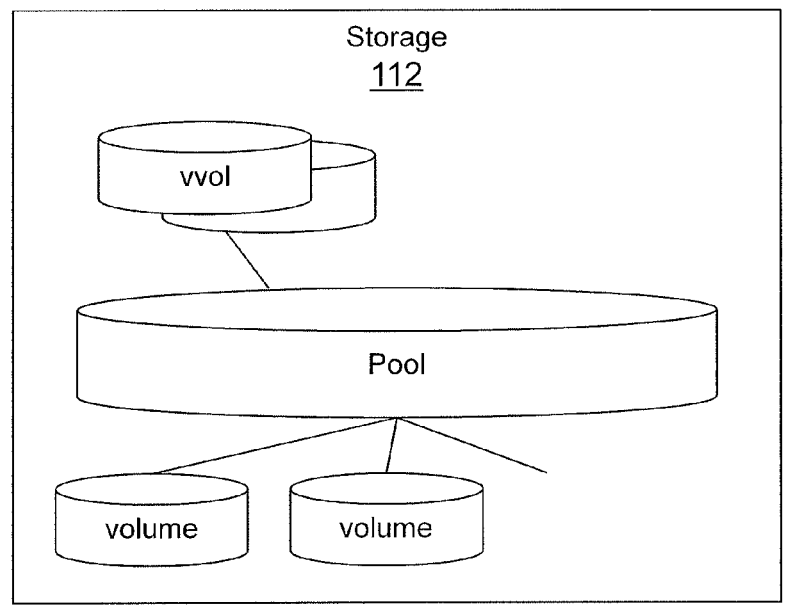
FIG. 3 illustrates an example of a virtual component of a storage.
FIG. 4 illustrates a configuration example of a configuration table.

FIG. 3 illustrates an example of the virtual component of the storage 112.

The storage 112 is an example of a component (for example, a physical component). As a virtual component of the storage 112, there are a plurality of pool volumes, a pool as an aggregate of the plurality of pool volumes, and a plurality of virtual volumes (for example, logical volumes complying with Thin Provisioning) associated with the pool. These virtual components are based on a plurality of physical storage devices (for example, at least one of the HDD and an SSD (Solid State Drive)) and a storage controller (for example, including a CPU and a memory) coupled to the plurality of physical storage devices. For example, the pool is based on the plurality of physical storage devices, and the plurality of virtual volumes are provided by the storage controller.

A configuration example of the above-described table will be described below.

FIG. 4 illustrates a configuration example of the configuration table 191.

The configuration table 191 has an entry for each component. Each entry holds information of a component ID 401, a component type 402, component name 403, virtual/physical (V/P) 404 and a relevant component ID 405.

The component ID 401 is an ID of the component. The component type 402 indicates a type of the component. The component name 403 indicates name of the component. The virtual/physical 404 indicates whether the component is a virtual component or a physical component. The relevant component ID 405 is a list of IDs of child components of the component.

Through such a configuration table 191, a component directly or indirectly coupled to the component can be specified. Note that at least part of the information registered in the configuration table 191 (such as, for example, the component ID 401 and the component type 402) may be displayed on the management screen.

FIG. 5 illustrates a configuration example of the configuration change history table 192.

The configuration change history table 192 has an entry for each configuration change operation (an example of user operation). Each entry holds information of configuration change time 501, a component ID 502, a component type 503, a change type 504, before change 505, after change 506 and a person who performs change 507.

The configuration change time 501 indicates time at which the configuration is changed (may be time at which change operation is accepted). Note that, while, in the present embodiment, a unit of time is year, month, date, hour, minute, second, the unit of time is not limited to these. The component ID 502 is an ID of the component whose configuration is changed. The component type 503 indicates a type of the component whose configuration is changed. The change type 504 indicates a type of configuration change (content of configuration change operation). The before change 505 indicates content of the component before configuration change. The after change 506 indicates content of the component after configuration change. The person who performs change 507 indicates an ID of the user who performs configuration change operation.

FIG. 6 illustrates a configuration example of the operation history table 193.

The operation history table 193 has an entry for each user operation (excluding configuration change operation). Each entry holds information of operation time 601, a component ID 602, a component type 603, an operation portion 604, an operation type 605, operation detail 606 and a person who performs change 607.

The operation time 601 indicates time at which the user operation is performed. The component ID 602 is an ID of the component designated as a target of the user operation. The component type 603 indicates a type of the component designated as a target of the user operation. The operation portion 604 indicates a portion designated as a target of the user operation (portion relating to the component). The operation type 605 indicates a type of the operation. The operation detail 606 indicates detail of the user operation. The person who performs change 607 indicates an ID (or name) of the user who performs the user operation.

FIG. 7 illustrates a configuration example of the failure occurrence history table 194.

The failure occurrence history table 194 has an entry for each component where a failure occurs. Each entry holds information of failure occurrence time 701, a component ID 702, a component type 703, a failure metric type 704, a failure type 705, virtual/physical (V/P) 706 and a failure level 707.

The failure occurrence time 701 indicates time at which the failure occurs. The component ID 702 is an ID of a component where the failure occurs. The component type 703 indicates a type of a component where the failure occurs. The failure metric type 704 indicates a metric type to which an abnormal metric value as a failure belongs. The failure type 705 indicates a type of the failure. The virtual/physical (V/P) 706 indicates whether the component is a virtual component or a physical component. The failure level 707 indicates a level of the failure.

FIG. 8 illustrates a configuration example of the read-ahead management table 196.

The read-ahead management table 196 has an entry for each component selected as a read-ahead target. Each entry holds registration time 801, a component ID 802, a component type 803, an event type 804, a score upon registration 805 and virtual/physical (V/P) 806.

The registration time 801 indicates time at which an ID, or the like, of the component is registered in an entry of the read-ahead management table 196 (or time at which performance data of the component is read to the memory 184). The component ID 802 is an ID of a component (for example, a component selected as a read-ahead target) corresponding to the performance data read to the memory 184. The component type 803 indicates a type of the component. The event type 804 indicates a type of a detected event (a failure or configuration change). The score upon registration 805 indicates a score of the component, which is a score at a time point when information of the component is registered in the read-ahead management table 196. The virtual/physical (V/P) 806 indicates whether the component is a virtual component or a physical component.

In the present embodiment, as described above, in addition to the information of the component corresponding to the read-ahead performance data, information of the component corresponding to the performance data read from the performance store 1461 to the memory 184 as a display target is registered in the read-ahead management table 196. Therefore, the read-ahead management table 196 only has to be a table obtained by expanding a storage management table (cache management table).

The configuration examples of the tables have been described above. In the tables in FIG. 5 to FIG. 8, a column (for example, a component type) of information which can be specified from the configuration table 191 in FIG. 4 using the component ID 401 as a key does not have to be provided. Further, there may be a column of a range of performance data (for example, a measurement time range) read to the memory 184 in the read-ahead management table 196.

Processing performed in the present embodiment will be described below.

Figure 9:
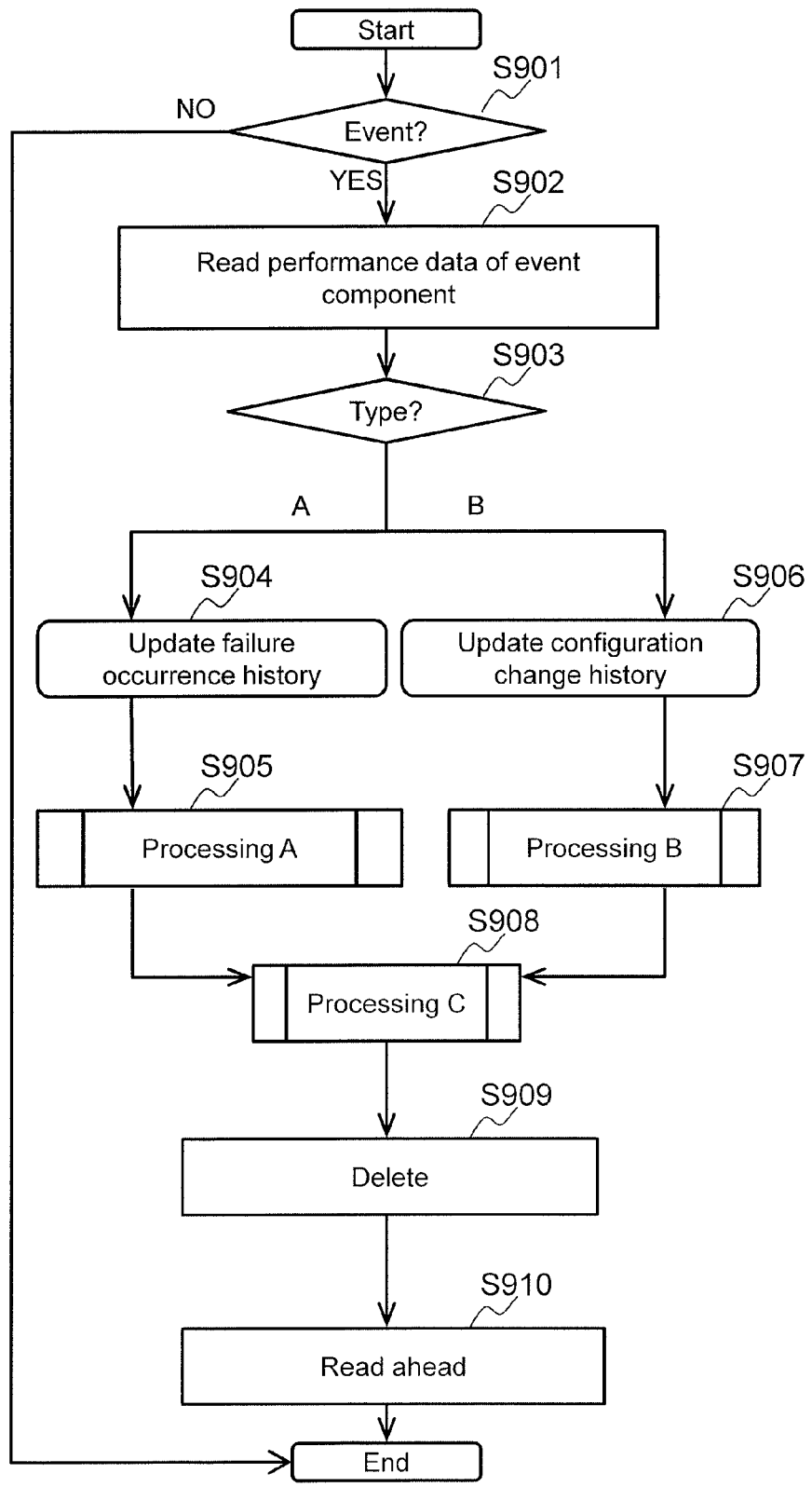
FIG. 9 illustrates an example of flow of read-ahead control processing.

FIG. 9 illustrates an example of flow of read-ahead control processing.

The read-ahead control processing is regularly or irregularly started. The management program 199 judges whether or not occurrence of an event (one of a failure and configuration change) is detected (S901). The occurrence of a failure can be detected by, for example, the management program 199 receiving a notification meaning a failure (for example, a status meaning a failure) from a node having a component where the failure occurs. The configuration change can be detected by, for example, the management program 199 receiving configuration change operation. In the case where the judgement result of S901 is negative, the processing is finished.

In the case where the judgement result of S901 is affirmative, read-ahead processing (S902 to S910) is started. The management program 199 reads (reads ahead) all the performance data of an event component which is a component where the event detected in S901 occurs (or performance data for which time a certain period of time before the time at which the event occurs is recorded among performance data of the event component) from the performance store 1461 to the memory 184, and registers information of the event component in the read-ahead management table 196 (S902). Note that, because the performance data read in S902 is data to be used in processing A and processing B, while at least one of processing A and processing B may be performed in place of S902, it is possible to read performance data which is highly likely to be made a display target by the user, which is performance data of the event component, more quickly, to the memory 184 by performing S902. Further, if the information of the event component is registered in the read-ahead management table 196 (if the performance data of the event component has already been stored in the memory 184), S902 may be skipped.

If the detected event type is a failure (S903: A), the management program 199 updates the failure occurrence history table 194 (S904), and performs processing A (S905). In S904, the management program 199 adds an entry and registers information relating to the detected failure to the added entry. In S905 (processing A), the management program 199 narrows down components and calculates a score for the component. Note that the "score" calculated for the component corresponds to priority of reading ahead the performance data of the component to the memory 184 or leaving the performance data. The score is greater for higher priority.

If the event type of the detected event is configuration change (S903: B), the management program 199 updates the configuration change history table 192 (S906) and performs processing B (S907). In S906, the management program 199 adds an entry and registers information relating to the detected configuration change operation to the added entry. In S907 (processing B), the management program 199 narrows down components and calculates a score for the component.

After S904 and S905, or after S906 and S907, the management program 199 performs processing C (S908). In S908 (processing C), the management program 199 calculates scores of respective components whose information is registered in the read-ahead management table 196 (hereinafter, cached components) and sorts the scores into the scores of the components and scores calculated in processing A or processing B. The cached component is an example of the stored component and at least a read-ahead component. The cached component may be a component corresponding to the performance data read from the performance store 1461 to the memory 184 because the performance data to be displayed is not stored in the memory 184 at a time point when display of the performance data to be displayed is requested.

The management program 199 deletes performance data of a component conforming to predetermined deletion conditions among cached components from the memory 184 and deletes information of the cached components from the read-ahead management table 196 (S909). If deletion unnecessary conditions such as an amount of space of the memory 184 exceeding a predetermined amount are satisfied, S909 may be skipped. If S909 is skipped, because a more amount of performance data is left in the memory 184, it can be expected that necessity of accessing the performance store 1461 in the case where it is necessary to display the performance data is reduced. Further, in S909, the cached component corresponding to the "predetermined deletion conditions" is, for example, a cached component which has been registered in the read-ahead management table 196 for more than a fixed period of time (for example, one week), a cached component for which maintenance and inspection are scheduled in a time slot determined in processing A or processing B (for example, a component specified from the user definition table 195), and a cached component with a relatively low score. The "relatively low score" may be a score less than a predetermined threshold or a score corresponding to a component of lower X % among the components narrowed down in processing A or processing B and the cached components (X is a value, for example, greater than 0 and less than 50).

The management program 199 reads ahead the performance data of the component whose information is not registered in the read-ahead management table 196 among components to which scores are given in processing A or processing B, from the performance store 1461 to the memory 184 and registers information of the component corresponding to the performance data read ahead to the memory 184 in the read-ahead management table 196 (S910). Note that performance data of the component whose information is registered in the read-ahead management table 196 among the components to which scores are given in processing A or processing B may be also read from the performance store 1461 to the memory 184. At this time, the read performance data may be all the performance data of the component or may be only performance data corresponding to a difference with performance data in the memory 184. In S901, the management program 199 may register an ID, or the like, of the component corresponding to the performance data read from the performance store 1461 to the memory 184 in the read-ahead management table 196.

Figure 10:
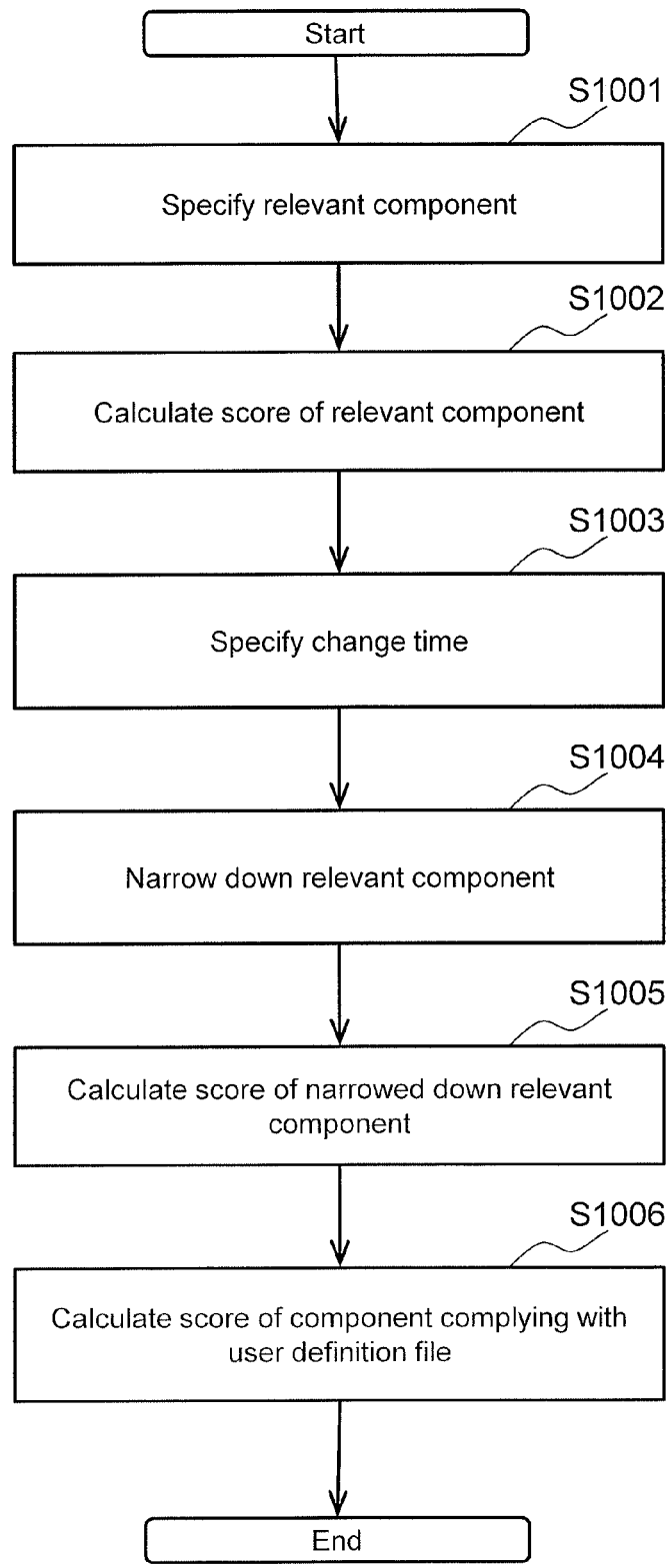
FIG. 10 illustrates an example of flow of processing A.

FIG. 10 illustrates an example of flow of processing A. In FIG. 10, for example, S1002 and S1003 to S1005 may be performed in any order or may be performed in parallel.

The management program 199 specifies relevant components of the event component (failure occurrence component) based on the configuration table 191 (S1001).

The management program 199 calculates a score of each of the event component and relevant components specified in S1001 (S1002). Calculation of the score complies with a predetermined score calculation rule (for example, a rule registered in the user definition table 195). Specifically, for example, a score calculated for a target component (component for which a score is to be calculated) is based on at least one of (s1) the number of hops between the target component (for example, the relevant component) and the event component, and (s2) a level of a layer to which the target component belongs among a plurality of layers of a topology. In the case where the calculation is based on (s1), when the number of hops between the target component and the event component is relatively small (for example, less than a threshold), the score tends to be high (for example, a value to be added is relatively high), because it can be considered that a component close to the event component in distance is highly likely to be made a display target. In the case where calculation is based on (s2), when a layer to which the target component belongs is relatively low (for example, lower than a predetermined layer), the score tends to be high, because it can be considered that a component belonging to a lower layer is largely affected, and, therefore, is highly likely to be made a display target.

The management program 199 narrows down relevant components specified in S1001. Specifically, for example, the management program 199 performs S1003 and S1004. In S1003, the management program 199 specifies change time which is time when tendency of a metric value changes by equal to or larger than a predetermined degree using the performance data (time-series performance data of the event component) read in S902 in FIG. 9. In S1004, the management program 199 specifies a component where an event belonging to the event type occurs in a time slot based on the change time among the relevant components specified in S1001, based on the configuration change history table 192 and the failure occurrence history table 194.

Figure 13:
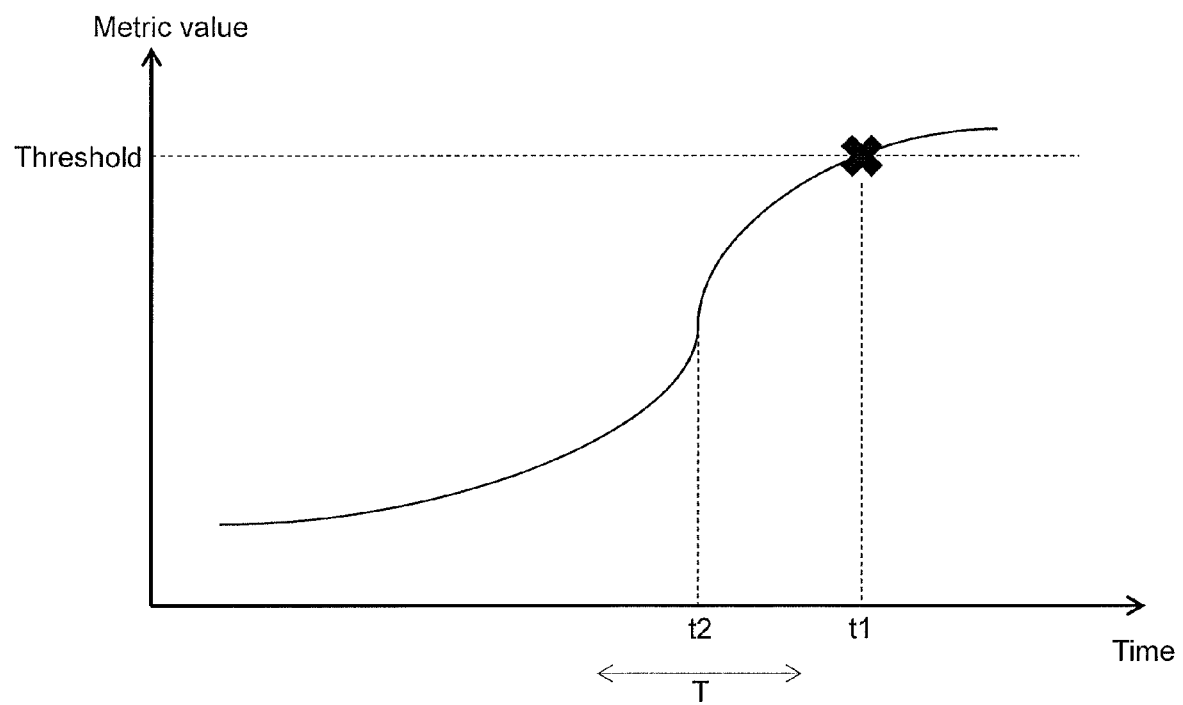
FIG. 13 illustrates an example of an explanatory diagram of S1003 and S1004 of processing B (S1103 and S1104 of processing C).

By S1003 and S1004, it can be expected that the relevant components specified in S1001 are narrowed down to a relevant component which is highly likely to be designated as a display target by the user in the future. An example of the reason will be described with reference to FIG. 13. It can be considered that there is a cause of the failure before the failure occurs at time t1. If a change rate of the metric value is constant, it may be possible to predict that a failure may occur in due course (and failure occurrence time) using, for example, an existing technology. However, there is a case where the change rate of the metric value is not constant, and it is not easy to specify a cause of occurrence of the failure in such a case. Therefore, in the present embodiment, time when tendency of the metric value changes by equal to or larger than a predetermined degree (for example, time corresponding to an inflection point, a discontinuous point, a point at which a quadratic differential value is not 0, or the like) t2 is defined as time when a cause of the failure occurs. Then, a relevant component where an event (a failure or configuration chance) occurs in a time slot T based on the time t2 (for example, a fixed time slot including the change time t2) can be considered as a component which is highly likely to be a cause of a failure and, therefore, whose performance data is to be designated by the user as a display target in the future. For the above reasons, the relevant components are narrowed down in S1003 and S1004.

The management program 199 calculates a score for each of the narrowed down relevant components (for example, adjusts a score calculated in S1002) (S1005). Specifically, for example, a score calculated for the target component is based on at least one of (s3) event types to which events occurring before the event occurrence time for the target component belong. A score tends to be higher for a failure than for configuration change, because it can be considered that a component where a failure occurs is likely to be selected by the user as a display target in the near future than a component whose configuration is changed. Note that, concerning calculation of a score, one of S1005 and S1002 may be skipped. In other words, a score may be calculated based on at least one of the above-described (s1) to (s3).

If designation of the component to be read ahead exists in the user definition table 195, the management program 199 gives the highest score (or a higher score) to the component among (than) scores of the relevant components narrowed down in S1003 and S1004 (S1006), to increase certainty of the component designated in the user definition table 195 being selected as a read-ahead target in S908 to S910 thereafter.

The management program 199 registers an ID and a score of each of read-ahead candidate components (the narrowed down relevant components and components specified from the user definition table 195) in the memory 184. The read-ahead candidate components may be lined in descending order of the score.

Figure 11:
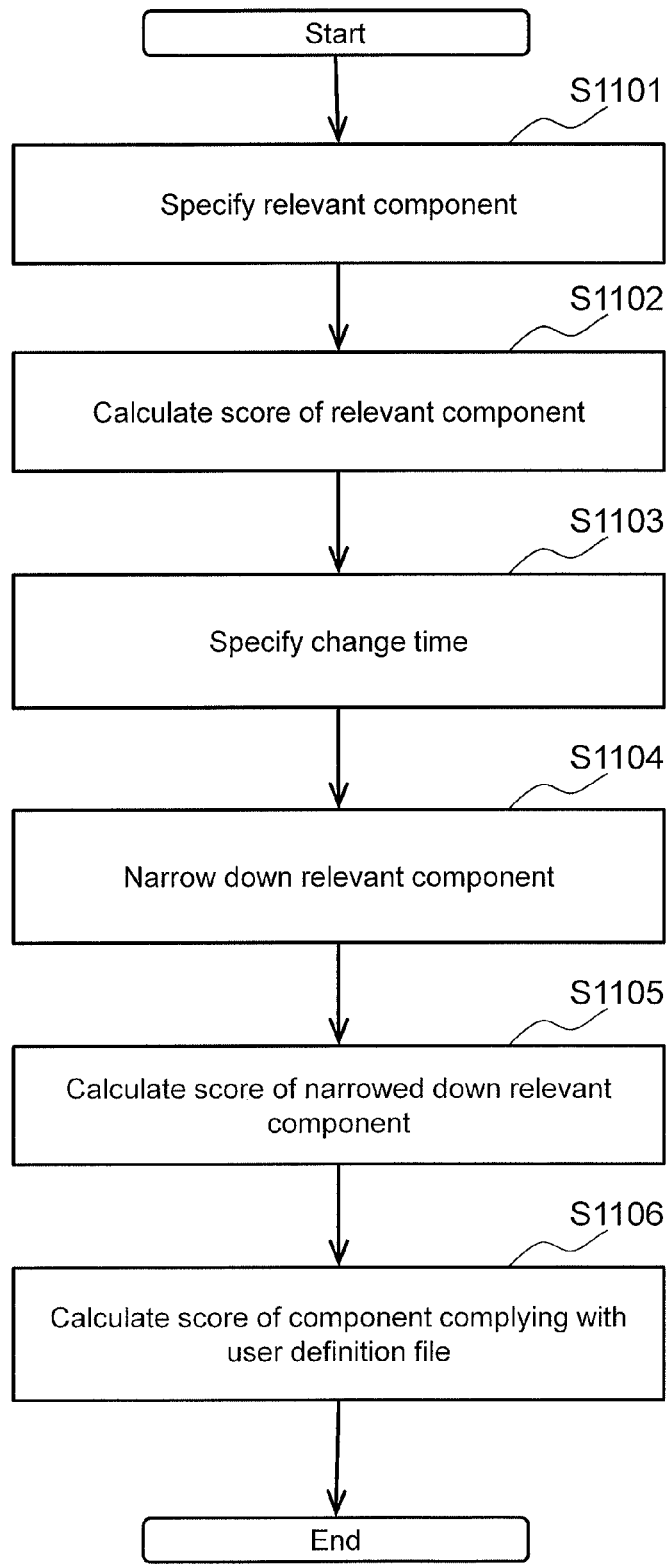
FIG. 11 illustrates an example of flow of processing B.

FIG. 11 illustrates an example of flow of processing B. In FIG. 11, for example, S1102 and S1103 to S1105 may be performed in any order or may be performed in parallel.

S1101 to S1106 in FIG. 11 are the same as S1001 to S1006 in FIG. 10 except the following points.

The event component is not a failure occurrence component but a component where configuration change occurs.

Note that a time slot in S1104 (time slot based on change time) is longer than a time slot in S1004 (time slot based on change time). An example of the reason is as follows. That is, in the case where the event is a failure, in order to check cause-and-effect relationship of a metric value which chances every second, it is preferable to check a time-series metric value which is fine in terms of time. On the other hand, in the case where the event is configuration change, to check steady check of the configuration change, it is preferable to check a metric value which is coarse in terms of time. In this manner, a length of the time slot which becomes a reference for narrowing down the relevant components is adjusted according to a difference in an event type of the occurring event, and this adjustment contributes improvement of read-ahead accuracy.

Figure 12:
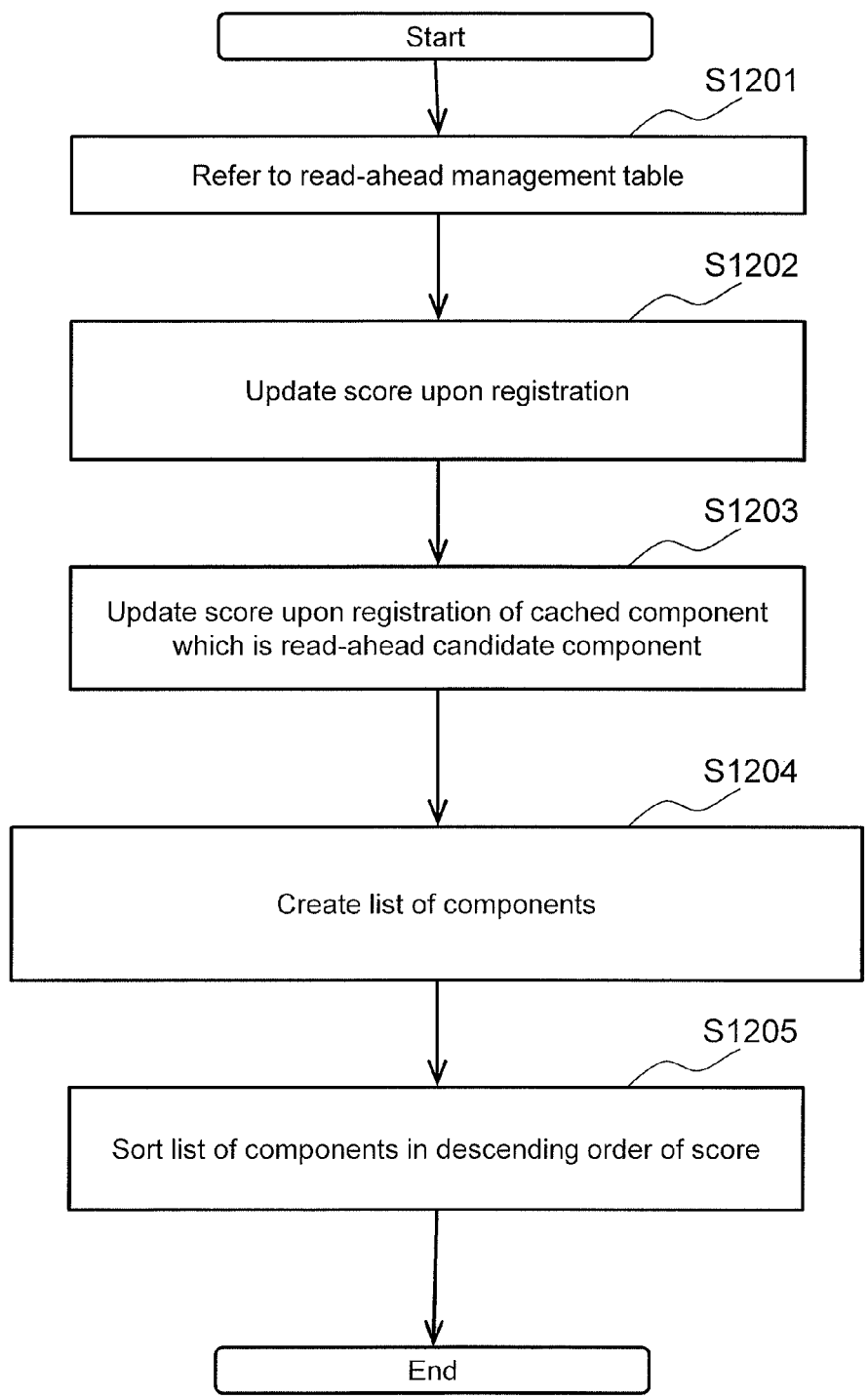
FIG. 12 illustrates an example of flow of processing C.

FIG. 12 illustrates an example of flow of processing C. S1202 and S1203 may be performed in reverse order, or may be performed in parallel.

The management program 199 refers to the read-ahead management table 196 (S1201).

The management program 199 updates a score upon registration corresponding to the cached component (component specified from the read-ahead management table 196) (S1202). The score upon registration may be a score calculated based on at least one of the above-described (s1) to (s3), and such a score is updated, for example, according to time elapsed since the cached component is registered (in other words, a period from current time to registration time) in S1201. If the elapsed time is comparatively long, a value is subtracted from the score upon registration.

If there is a read-ahead candidate component whose information is registered in the read-ahead management table 196 among the read-ahead management components obtained in processing A or processing B, the management program 199 adds a value to the score upon registration corresponding to the read-ahead candidate component (S1203).

The management program 199 registers IDs of the cached components and IDs of the read-ahead candidate components obtained in processing A or processing B in the memory 184 and rearranges these IDs in descending order of the score.

While an embodiment has been described above, the embodiment is an example for explaining the present invention and is not intended to limit the scope of the present invention only to the embodiment. The present invention can be implemented in other various kinds of forms. For example, a maintenance and inspection component for which it is specified from the user definition table 195, or the like, that maintenance and inspection are performed in a time slot of processing A or processing B, may be processed as follows. That is, if there is no information of the maintenance and inspection component in the read-ahead management table 196, the management program 199 does not have to calculate a score for the maintenance and inspection component. If there is information of the maintenance and inspection component in the read-ahead management table 196, the management program 199 does not have to change a score upon registration of the maintenance and inspection component or may set the lowest value, or may delete the performance data of the maintenance and inspection component from the memory 184. The performance data of the maintenance and inspection component is less likely to be designated by the user as a target to be browsed, and performance data of such a component can be preferentially deleted from the memory 184.

REFERENCE SIGNS LIST

101: computer system
131: management computer

The invention claimed is:

1. A management system of a computer system including a plurality of components, the management system comprising:
   a memory; and
   a processor communicatively coupled to the memory, the processor configured to, in the case where performance data to be displayed among performance data of the plurality of components is not stored in the memory, read the performance data to be displayed from a performance store which is a store in which the performance data of the plurality of components is stored to the memory and display the performance data to be displayed in the memory,
   wherein, in the case where the processor detects occurrence of an event belonging to an event type defined as an event type for which display of performance data is to be requested in the future, wherein each piece of the performance data includes time and a performance value:
      the processor is configured to store, in the memory, event history information which is information indicating time at which the event belonging to the event type occurs and a component where the event occurs, and
      the processor is configured to
         (A) select at least one of relevant components of an event component as a read-ahead target, the event component being a component where the event occurs, and the relevant components being components directly or indirectly coupled to the event component,
            (a1) specify change time which is time at which tendency of the performance value changes by equal to or larger than a predetermined degree based on time-series performance data of the event component, and
            (a2) specify a relevant component where the event belonging to the event type occurs in a time slot based on the change time among the relevant components based on the event history management information,
            the relevant component selected as the read-ahead target in (A) being at least one of the components specified in (a2), and
         (B) read performance data of the selected relevant component in addition to performance data of the event component from the performance store to the memory.

2. The management system according to claim 1,
wherein, the processor is configured to,
   in the case where the processor detects occurrence of the event, read the time-series performance data of the event component from the performance store to the memory, and
   in (a1), specify the change time based on the time-series performance data in the memory, and
   in (B) thereafter, read performance data of the relevant component selected as the read-ahead target in (A) to the memory.

3. The management system according to claim 2,
wherein a score is calculated by the processor for each of the relevant components specified in (a2) and each of components whose performance data is stored in the memory,
the component selected as the read-ahead target in (A) is based on the calculated score,
the score calculated for a component for which a score is to be calculated is based on at least one of (s1) to (s3)
(s1) the number of hops between the component and the event component,
(s2) a level of a layer to which the component belongs among a plurality of layers of a topology, and
(s3) an event type to which an event occurring before event occurrence time for the component belongs.

4. The management system according to claim 2,
wherein the processor is configured to store, in the memory, memory management information in which an ID of a component corresponding to the performance data read from the performance store to the memory and registration time of the ID are registered,
the processor is configured to add information of the component whose performance data is read from the performance store to the memory to the memory management information,
the processor is configured to delete performance data of a stored component with a relatively low score from the memory, and
the score calculated for each of the stored components is a score calculated based on a score at a time point when information of the stored component is registered in the memory management information, elapsed time since registration time corresponding to the stored component and whether or not the stored component is included in the relevant components.

5. The management system according to claim 4,
wherein the processor is configured to delete performance data from the memory, not to change a score or to set a lowest value as a score for a component for which maintenance and inspection are scheduled in the time slot.

6. The management system according to claim 1,
wherein, as the event type, there are a failure and configuration change, and
when the event type is configuration change, the time slot is longer than when the event type is a failure.

7. The management system according to claim 1,
wherein the computer system includes a storage apparatus and a computer coupled to a plurality of network switches,
in at least one computer, a plurality of virtual computers which perform input/output to/from a plurality of logical volumes provided by at least one storage apparatus are executed, and
the plurality of components include the plurality of virtual computers.

8. A management method comprising:

by a management system of a computer system including a plurality of components, detecting occurrence of an event which occurs at at least one of the plurality of components, and which belongs to an event type defined as an event type for which display of performance data is to be requested in the future, and, in the case where performance data to be displayed among performance data of the plurality of components is not stored in a memory of the management system, the management system reading the performance data to be displayed from a performance store which is a store in which the performance data of the plurality of components is stored to the memory of the management system of the computer system and displaying the performance data, wherein each piece of the performance data includes time and a performance value, the management system storing event history information which is information indicating time at which the event belonging to the event type occurs and a component where the event occurs, and in the case where the event is detected,
- (A) selecting at least one of relevant components of an event component as a read-ahead target, the event component being a component where the event occurs, and the relevant components being components directly or indirectly coupled to the event component,
- (a1) specify change time which is time at which tendency of the performance value changes by equal to or larger than a predetermined degree based on time-series performance data of the event component, and
- (a2) specify a relevant component where the event belonging to the event type occurs in a time slot based on the change time among the relevant components based on the event history management information,
- the relevant component selected as the read-ahead target in (A) being at least one of the components specified in (a2), and
- (B) in addition to performance data of the event component, reading performance data of the selected relevant component from the performance store to the memory.

9. A non-transitory computer-readable storage medium storing a computer program executed at a management system of a computer system including a plurality of components, in the case where performance data to be displayed among performance data of the plurality of components is not stored in a memory of the management system, the management system reading the performance data to be displayed from a performance store which is a store in which the performance data of the plurality of components is stored to the memory of the management system of the computer system and displaying the performance data to be displayed, wherein each piece of the performance data includes time and a performance value, the computer program causing the management system to:

detect occurrence of an event which occurs at at least one of the plurality of components, and which belongs to an event type defined as an event type for which display of performance data is to be requested in the future;

store event history information which is information indicating time at which the event belonging to the event type occurs and a component where the event occurs;

in the case where the event is detected,
- (A) select at least one of relevant components of an event component as a read-ahead target, the event component being a component where the event occurs, and the relevant components being components directly or indirectly coupled to the event component,
- (a1) specify change time which is time at which tendency of the performance value changes by equal to or larger than a predetermined degree based on time-series performance data of the event component, and
- (a2) specify a relevant component where the event belonging to the event type occurs in a time slot based on the change time among the relevant components based on the event history management information,
- the relevant component selected as the read-ahead target in (A) being at least one of the components specified in (a2); and
- (B) in addition to performance data of the event component, read performance data of the selected relevant component from the performance store to the memory.

* * * * *